(12) United States Patent
Field et al.

(10) Patent No.: US 9,043,793 B1
(45) Date of Patent: May 26, 2015

(54) VERIFICATION OF CONTROLS IN INFORMATION TECHNOLOGY INFRASTRUCTURE VIA OBLIGATION ASSERTION

(75) Inventors: John P. Field, Chatham, NJ (US); Thomas R. Maguire, Brewster, NY (US); Stephen G. Graham, Chapel Hill, NC (US); Edgar St. Pierre, Venice, FL (US)

(73) Assignee: EMC Corporation, Hopkinton, MA (US)

( * ) Notice: Subject to any disclaimer, the term of this patent is extended or adjusted under 35 U.S.C. 154(b) by 1063 days.

(21) Appl. No.: 13/075,639

(22) Filed: Mar. 30, 2011

(51) Int. Cl.
*G06F 9/46* (2006.01)
*G06F 7/04* (2006.01)
*G06F 12/00* (2006.01)
*G06F 12/14* (2006.01)
*G06F 13/00* (2006.01)
*G11C 7/00* (2006.01)
*G06F 17/30* (2006.01)
*G06F 21/50* (2013.01)

(52) U.S. Cl.
CPC .................................... *G06F 21/50* (2013.01)

(58) Field of Classification Search
None
See application file for complete search history.

(56) References Cited

U.S. PATENT DOCUMENTS

| | | | |
|---|---|---|---|
| 8,352,941 B1 * | 1/2013 | Protopopov et al. | 718/1 |
| 2009/0320093 A1 * | 12/2009 | Glazier et al. | 726/1 |
| 2011/0213688 A1 * | 9/2011 | Santos et al. | 705/34 |

OTHER PUBLICATIONS

"eXtensible Access Control Markup Language (XACML) Version 3.0," OASIS, Committee Specification 01, Aug. 2010, pp. 1-150.
"RSA enVision® Platform at a Glance," The Security Division of EMC, 3-in-1 Log Management Solution, Product Data Sheet, 2008-2009, 2 pages.
U.S. Appl. No. 12/982,288 filed in the name of J.P. Field et al. Dec. 30, 2010 and entitled "Distributed Security Information and Event Management System with Application-Injected Remote Components."

* cited by examiner

*Primary Examiner* — Eric C Wai
(74) *Attorney, Agent, or Firm* — Ryan, Mason & Lewis, LLP

(57) ABSTRACT

A processing device comprises a processor coupled to a memory and implements an obligation management system for information technology infrastructure, with the obligation management system being configured to process a plurality of obligations on behalf of a relying party to verify implementation of corresponding controls in information technology infrastructure of a claimant. A given one of the obligations has an associated obligation fulfiller that is inserted or otherwise deployed as a component within the information technology infrastructure of the claimant and is configured to provide evidence of the implementation of one or more of the controls responsive to an obligation assertion so as to establish an associated trust aspect of the claimant. The information technology infrastructure may comprise distributed virtual infrastructure of a cloud service provider. The claimant may comprise the cloud service provider and the relying party may comprise a tenant of the cloud service provider.

23 Claims, 11 Drawing Sheets

VERIFICATION OF CONTROLS IN INFORMATION TECHNOLOGY INFRASTRUCTURE VIA OBLIGATION ASSERTION

FIELD OF THE INVENTION

The present invention relates generally to the field of information processing, and more particularly to verification of controls for distributed virtual infrastructure or other types of information technology infrastructure.

BACKGROUND OF THE INVENTION

An increasing number of companies and other enterprises are reducing their costs by migrating portions of their information technology infrastructure to cloud service providers. For example, virtual data centers and other types of systems comprising distributed virtual infrastructure are coming into widespread use. Commercially available virtualization software such as VMware® vSphere™ may be used to build a variety of different types of virtual infrastructure, including private and public cloud computing and storage systems, distributed across hundreds of interconnected physical computers and storage devices. Cloud service providers build and maintain such systems.

In cloud-based system arrangements of the type described above, enterprises in effect become tenants of the cloud service providers. However, the enterprises ultimately remain responsible for compliance issues. More particularly, the enterprises are generally still responsible for performing governance, risk management and compliance (GRC) audits, and for proving compliance with relevant industry control standards such as PCI, and government regulations such as HIPPA, even though the enterprises have outsourced portions of their information technology infrastructure to the service providers. This creates a problem, in that it can be very difficult for the enterprises to verify that the service providers have the appropriate controls in place, and to establish sufficient levels of trust in the service providers with respect to ongoing implementation of such controls.

Because a given enterprise does not own the information technology infrastructure it is attempting to verify, it often has to rely on a manual compliance audit performed by the service provider or an authorized representative of the service provider, or by an independent third party. Such audits are usually labor-intensive and costly, and are therefore typically done on an infrequent basis. Also, the enterprise has to implicitly trust the findings of an auditor. When the verification of controls is done manually the audit results may contain errors and omissions, may be too coarse-grained, and may not be "real time" (i.e., completely current). The manual auditing process may have occurred days or even weeks before and therefore may have missed any transient non-compliance.

Similar problems arise with regard to verification of other types of controls, such as adherence of the service provider to a service level agreement.

In view of the above, a need exists for an improved approach to verification of controls in cloud-based systems and other types of information technology infrastructure.

SUMMARY OF THE INVENTION

Illustrative embodiments of the present invention provide information processing systems in which verification of controls in information technology infrastructure may be performed continuously and automatically via obligations. Such obligations can be used to provide evidence on a regular basis of the implementation of the corresponding controls.

In one aspect, a processing device comprises a processor coupled to a memory and implements an obligation management system for information technology infrastructure, with the obligation management system being configured to process a plurality of obligations on behalf of a relying party to verify implementation of corresponding controls in information technology infrastructure of a claimant. A given one of the obligations has an associated obligation fulfiller that is inserted or otherwise deployed as a component within the information technology infrastructure of the claimant and is configured to provide evidence of the implementation of one or more of the controls responsive to an obligation assertion so as to establish an associated trust aspect of the claimant. The information technology infrastructure may comprise distributed virtual infrastructure of a cloud service provider. In such an arrangement, the claimant may comprise the cloud service provider and the relying party may comprise a tenant of the cloud service provider.

The illustrative embodiments advantageously overcome one or more of the above-noted drawbacks of conventional control verification approaches. For example, one or more of the disclosed arrangements allow a tenant to establish a quantified level of trust in a cloud service provider, while avoiding the drawbacks of conventional manual audits. This considerably facilitates the provisioning of compliant information processing systems, particularly in large-scale public or private clouds using distributed virtual infrastructure.

These and other features and advantages of the present invention will become more readily apparent from the accompanying drawings and the following detailed description.

DETAILED DESCRIPTION

The present invention will be described herein with reference to exemplary information processing systems and associated servers, computers, storage devices and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

Figure 1:
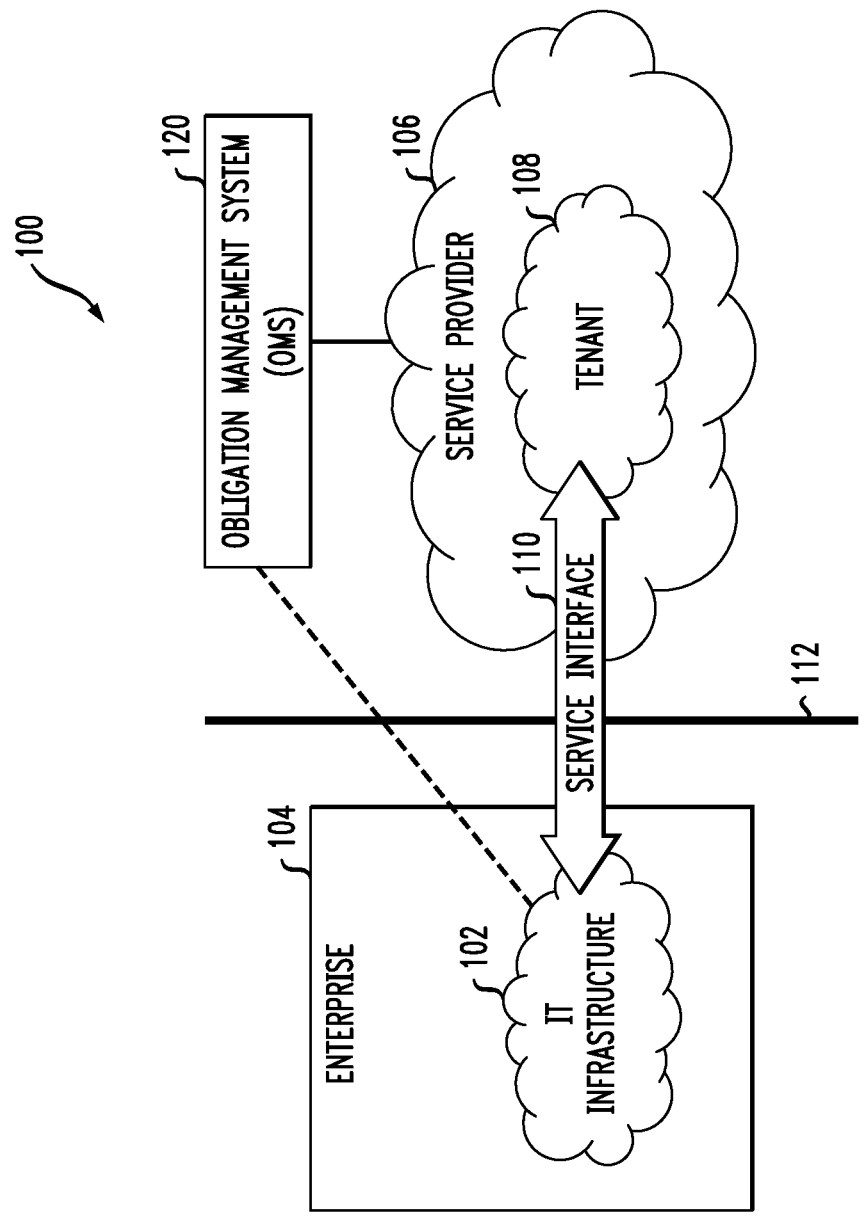
FIG. 1 shows an information processing system that incorporates control verification functionality in an illustrative embodiment of the invention.

FIG. 1 shows an information processing system 100 configured with control verification functionality in accordance with an illustrative embodiment of the invention. The system 100 in this embodiment comprises information technology (IT) infrastructure 102 of an enterprise 104. The enterprise 104 owns and manages the IT infrastructure 102, and that infrastructure is therefore within a trust boundary of the enterprise. The system 100 further comprises IT infrastructure 106 of a service provider. The IT infrastructure 106 may comprise, for example, distributed virtual infrastructure of a cloud service provider. The term "cloud service provider" as used herein is intended to be broadly construed, so as to encompass private cloud as well as public cloud arrangements. The service provider IT infrastructure 106 may be used to provide one or more delivered services for the enterprise 104, including, but not limited to, Infrastructure as a Service (IAAS), Platform as a Service (PAAS), and Software as a Service (SAAS). In receiving one or more such services, the enterprise 104 utilizes a portion of the service provider IT infrastructure 106 as a tenant 108. The tenant 108 is configured to communicate via a service interface 110 with the IT infrastructure 102 of the enterprise 104. The service interface spans a physical boundary 112 between the IT infrastructure 102 and 106 of the respective enterprise and service provider. Those skilled in the art will recognize that communication over the service interface 112 may be secured using well understood techniques such as Transport Layer Security (TLS) or Secure Sockets Layer (SSL) or other techniques to ensure confidentiality and integrity.

The enterprise 104 is desirous of establishing a virtual trust boundary that encompasses its own IT infrastructure 102 as well as the portion of the service provider IT infrastructure 106 that is occupied by tenant 108. The control verification functionality disclosed herein allows the enterprise to establish a quantified level of trust in the service provider, so as to facilitate satisfaction of compliance requirements of the enterprise as well as other operating goals of the enterprise such as verifying the proper provisioning of services in accordance with established service level agreements. In the present embodiment, the tenant may be viewed as a relying party, in that it relies on certain controls being implemented by the service provider, and the service provider may be viewed as a claimant, in that it represents to the tenant that the controls at issue are actually present. An arrangement of this type will be described in greater detail below with reference to FIG. 3A. The relying party and claimant may alternatively represent portions of the respective tenant and service provider. Also, other entities may serve in the roles of claimant and relying party in alternative embodiments. By way of example, the service provider may be a relying party that verifies the presence and performance of controls implemented by the tenant as a claimant. An arrangement of this type will be described in greater detail below with reference to FIG. 3B.

The control verification functionality is provided in information processing system 100 at least in part through the use of an obligation management system 120, which in the present embodiment is shown as being implemented on the service provider side of the boundary 112 and coupled to service provider IT infrastructure 106, and also coupled to the enterprise IT infrastructure 102. In other embodiments, the obligation management system may be implemented, for example, at least in part within the service provider IT infrastructure 106, distributed across the IT infrastructure 102 and the IT infrastructure 106, or entirely within the tenant 108. The obligation management system 120 utilizes obligations to provide evidence of the implementation of corresponding controls by the service provider. More particularly, the obligation management system 120 is configured to process obligations on behalf of a relying party to verify implementation of corresponding controls in IT infrastructure of a claimant. Each of the obligations may have an associated obligation fulfiller that is inserted or otherwise deployed as a component within the IT infrastructure of the claimant and is configured to provide evidence of the implementation of one or more of the controls responsive to an obligation assertion so as to establish an associated trust aspect of the claimant. The obligation fulfillers may be installed as components within the IT infrastructure of the claimant and may serve as respective proxies for exposing settings or other characteristics of one or more of the controls of that infrastructure.

The obligations and other associated components may be implemented at least in part using Aspect Oriented Programming (AOP) constructs or other types of software or hardware components. By way of example, an obligation may comprise an identified set or collection of processing instructions, operations and/or processing conditions that must be performed or guaranteed by a claimant's fulfiller implementation, in addition to the primary processing operations that are required in order to deliver the promised service or function. A more specific example is eXtensible Access Control Markup Language (XACML) Obligations, as described in OASIS XACML Version 3.0, Committee Specification 01, xacml-3.0-core-spec-cs-01-en, 10 Aug. 2010, which is incorporated by reference herein. An XACML Obligation can be used to augment the security of an application with additional code that must be executed in conjunction with an application request as a condition of allowing that application request to be performed. An XACML Obligation can be very specific to details of an application without modifying the underlying application code. Additional details regarding the use of these and other obligations in a security information and event management (SIEM) system can be found in U.S. patent application Ser. No. 12/982,288, filed Dec. 30, 2010 and entitled "Distributed Security Information and Event Management System with Application-Injected Remote Components," which is commonly assigned herewith and incorporated by reference herein. The techniques disclosed therein can be used to enhance the functionality of a centralized SIEM system such as the enVision® platform commercially available from RSA, The Security Division of EMC Corporation.

As indicated above, the various elements of service provider IT infrastructure 106 of information processing system 100, which may include at least a portion of the obligation management system, may be implemented at least in part using public or private cloud infrastructure, or other distributed infrastructure. Such a distributed infrastructure may comprise, by way of example, a hypervisor platform and associated virtual processing and storage elements. An example of a commercially available hypervisor platform suitable for use in an embodiment of the invention is the VMware® vSphere™ which may include an associated management system such as vCenter™. The distributed infrastructure may further comprise one or more distributed processing platforms that include storage hardware products such as Celerra® and CLARiiON®, both commercially available from EMC Corporation of Hopkinton, Mass. A variety of other storage products, such as VNX and Symmetrix VMAX, both also from EMC Corporation, may be utilized to implement at least a portion of the IT infrastructure 106.

It is to be appreciated that the particular arrangement of elements shown in FIG. 1 is presented by way of illustrative example only, and in other embodiments different arrangements of additional or alternative elements may be used. Moreover, the functionalities associated with separate elements in the FIG. 1 embodiment may be combined into a lesser number of elements each of which performs multiple functions. Thus, at least a subset of the elements may be collectively implemented on a common processing platform, or each such element may be implemented on a separate processing platform comprising one or more servers, computers or other processing devices. For example, the tenant 108 and obligation management system 120 may each run on a separate processing platform, or portions of such elements may run on the same platform.

Figure 2:
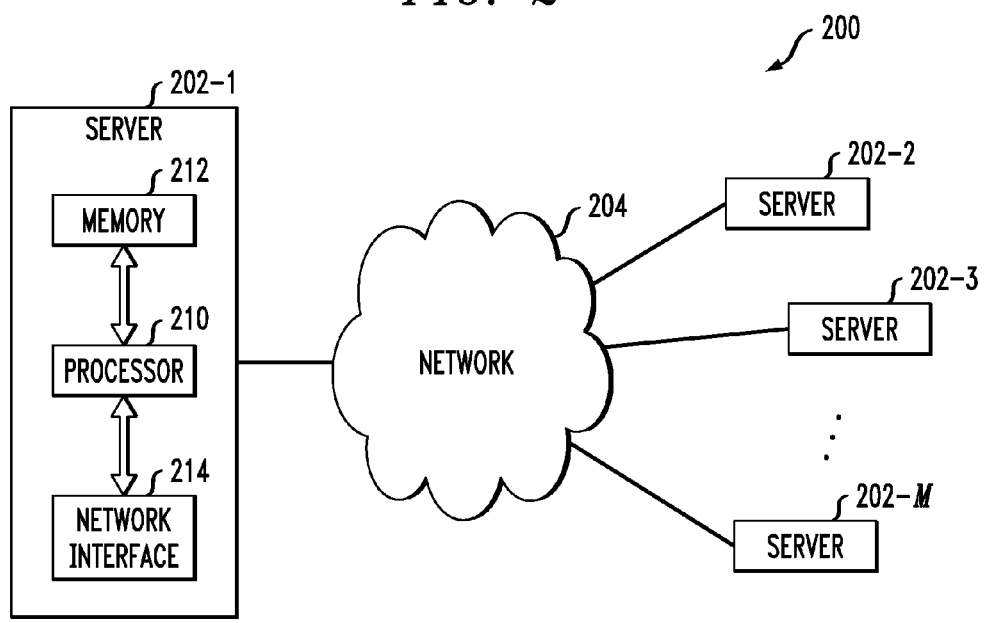
FIG. 2 is a block diagram of an exemplary processing platform that may be utilized to implement at least a portion of the FIG. 1 information processing system.

An example of a processing platform that may be used to implement at least a portion of the information processing system 100 is processing platform 200 shown in FIG. 2. The processing platform 200 in this embodiment comprises at least a portion of the system 100 and includes a plurality of servers, denoted 202-1, 202-2, 202-3, . . . 202-M, which communicate with one another over a network 204. One or more of the elements within enterprise IT infrastructure 102 or service provider IT infrastructure 106 of system 100 may therefore each run on a server, computer or other processing platform element, which may be viewed as an example of what is more generally referred to herein as a "processing device." As illustrated in FIG. 2, such a device generally comprises at least one processor and an associated memory, and implements one or more functional modules for controlling certain features of the information processing system 100. Again, multiple elements may be implemented by a single processing device in a given embodiment.

The server 202-1 in the processing platform 200 comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements. The memory 212 may be viewed as an example of what is more generally referred to herein as a "computer program product" having executable computer program code embodied therein. Such a memory may comprise electronic memory such as random access memory (RAM), read-only memory (ROM) or other types of memory, in any combination. The computer program code when executed by a processing device such as the server 202-1 causes the device to perform functions associated with one or more of the elements of enterprise IT infrastructure 102 or service provider IT infrastructure 104, or portions thereof. One skilled in the art would be readily able to implement such software given the teachings provided herein. Other examples of computer program products embodying aspects of the invention may include, for example, optical or magnetic disks.

Also included in the server 202-1 is network interface circuitry 214, which is used to interface the server with the network 204 and other system components. Such circuitry may comprise conventional transceivers of a type well known in the art.

The other servers 202 of the processing platform 200 are assumed to be configured in a manner similar to that shown for server 202-1 in the figure.

The processing platform 200 shown in FIG. 2 may comprise additional known components such as batch processing systems, parallel processing systems, physical machines, virtual machines, virtual switches, storage volumes, etc. Again, the particular processing platform shown in the figure is presented by way of example only, and system 100 may include additional or alternative processing platforms, as well as numerous distinct processing platforms in any combination.

It should be understood that a given embodiment of the system 100 may include multiple instances of the elements 102, 104, 106, 108, 110, 112 and 120, and other system elements, although only single instances of such elements are shown in the system diagram for clarity and simplicity of illustration. For example, separate obligation management systems may be implemented on both the enterprise side and the service provider side of boundary 112. One possible arrangement of this type will be described in conjunction with FIG. 11A. As another example, embodiments of the invention may comprise virtualized and/or non-virtualized implementations of obligation management systems and/or controls.

Also, numerous other arrangements of computers, servers, storage devices or other components are possible in the information processing system 100. Such components can communicate with other elements of the information processing system 100 over any type of network, such as a wide area network (WAN), a local area network (LAN), a satellite network, a telephone or cable network, or various portions or combinations of these and other types of networks.

The operation of the information processing system 100 will now be described in greater detail with reference to FIGS. 3 through 11.

As indicated previously, conventional approaches to verification that desired controls are implemented by a cloud service provider for an enterprise tenant are problematic in that such approaches typically involve time-consuming and error-prone manual audits. The information processing system 100 overcomes these and other drawbacks of conventional practice by providing obligation-based control verification functionality. Such an arrangement allows efficient and continuous automated monitoring of service provider controls, thereby facilitating the establishment of a level of quantified trust in the service provider.

Figure 3A:
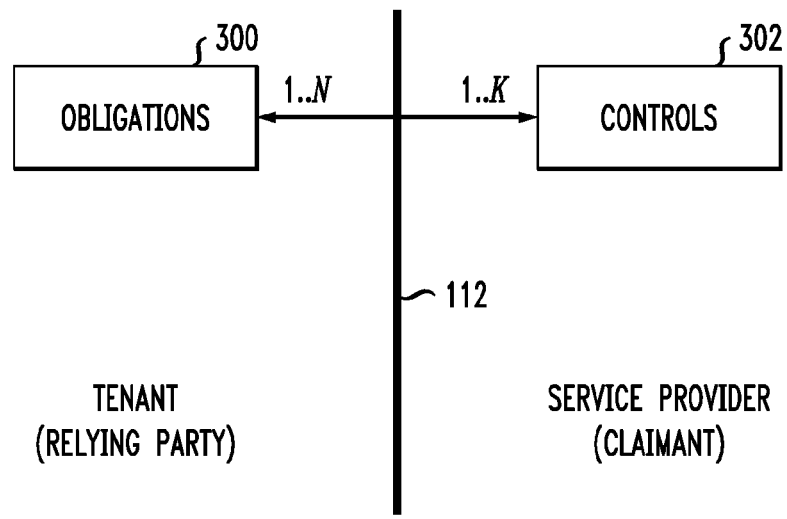
FIGS. 3A and 3B illustrate possible relationships between obligations and controls in the system of FIG. 1.

Referring now to FIG. 3A, an exemplary relationship between obligations and controls in information processing system 100 is shown. In this embodiment, as previously noted, the tenant 108 is the relying party and the service provider is the claimant. Associated with the tenant 108 are up to N obligations for verifying up to K corresponding controls 302 of the service provider IT infrastructure 106. Each obligation is associated with the implementation of one or more controls, and each control may be associated with one or more obligations. Thus, in a given embodiment there may be one-to-one, one-to-many or many-to-one relationships between obligations and controls. An obligation may represent, for example, functional or nonfunctional processing requirements. The actual processing that is implied by an obligation may supplement portions of the service provider IT infrastructure 106, application logic of the enterprise 104, or other system components, in any combination. The obligation is introduced into the information processing system 100 for the express purpose of serving as proof of the implementation of one or more controls.

Figure 3B:
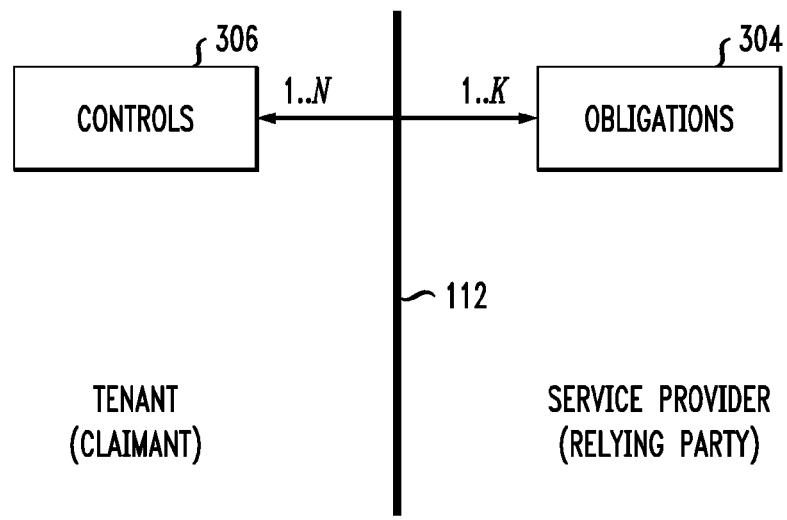

It is also possible for the service provider to use obligations to verify the implementation of controls within the tenant, as is illustrated in FIG. 3B. In such an embodiment, obligations 304 associated with the service provider as relying party are used to verify controls 306 associated with the tenant 108 as claimant. Thus, the roles of claimant and relying party are reversed in the FIG. 3B arrangement relative to the FIG. 3A arrangement. The obligation processing is otherwise substantially the same for either arrangement. Other arrangements are also possible. For example, the obligation processing can be done by another service provider, using a trusted third party (TTP) model. The TTP is another service provider whose function is to perform the role of attestation between the other two parties. Examples of an arrangement of this type may be similar to those shown in FIG. 11, but with an obligation management system located at a third party, namely, another service provider.

Figure 4:
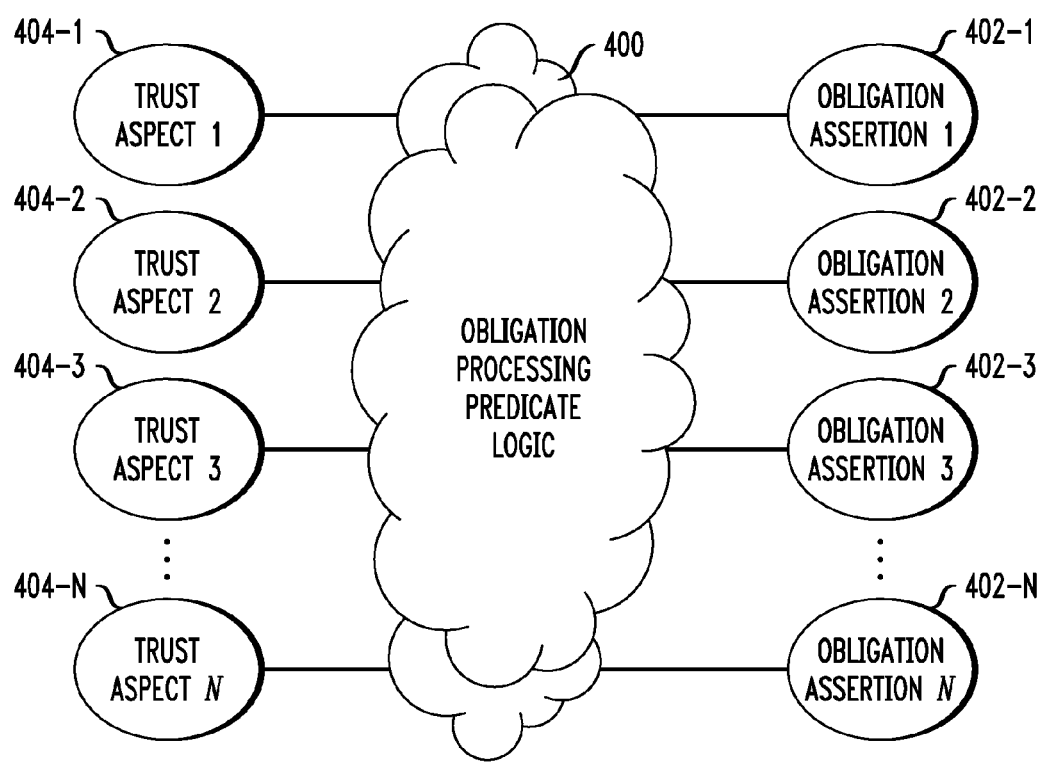
FIG. 4 is a diagram showing the operation of obligation processing predicate logic in the FIG. 1 system.

In the information processing system 100, as previously noted, each of the obligations 300 or 304 has an associated obligation fulfiller that is inserted or otherwise deployed as a component within the IT infrastructure of the claimant and is configured to provide evidence of the implementation of one or more of the controls responsive to an obligation assertion so as to establish an associated trust aspect of the claimant. This process, which is implemented by the obligation management system 120 in the present embodiment, may make use of obligation processing predicate logic, an example of which is shown in FIG. 4. In this figure, obligation processing predicate logic 400 controls a mapping between obligation assertions 402-1, 402-2, . . . 402-N and corresponding trust aspects 404-1, 404-2, . . . 404-N of the claimant. Thus, the predicate logic 400 determines what obligation-based criteria are associated with particular ones of a plurality of trust aspects of the claimant. In order to establish a particular one of the trust aspects 404, the relying party issues the corresponding obligation assertion 402 via the obligation management system 120.

The obligation processing predicate logic 400 can be used to dynamically calibrate the trust aspects 404 by the number and type of obligation assertions 402 that are validated as being fulfilled. The specific logic for computing what combination or sequence of obligation assertions is required in order to establish a specific level or aspect of trust in the service provider may vary depending upon the requirements of a given embodiment.

In alternative embodiments, the obligation processing predicate logic 400 may be replaced with other types of rules or algorithms for describing the criteria for a combination of obligations to satisfy a defined trust aspect. If the claimant infrastructure is not verified as compliant responsive to a given obligation assertion or a set of such assertions, then the relying party can take appropriate defensive actions.

It should be noted that obligations may be asserted using in-band or out-of-band techniques. An in-band obligation assertion may be associated with an existing request/response protocol carried out between the enterprise and the service provider. For example, such in-band assertions may use HTTP message headers or message bodies to convey a required obligation from the tenant to the service provider as part of any HTTP request. The HTTP response could contain the obligation fulfillment response. In an out-of-band embodiment, the obligation assertions could be communicated using a common protocol such as HTTP from the relying party to the claimant independently of any other application resource requests. In this case, the relying party can list any required obligations and the claimant would respond with the corresponding obligation fulfillment results.

The obligation processing predicate logic can directly validate the presence and performance of a corresponding control. For example, a given obligation assertion can be used to directly validate that an application is currently running on a specific host, with a defined software stack. This may involve leveraging the presence of a Trusted Platform Module (TPM), which is a chip or other processing device that assures secure generation of cryptographic keys and provides other functions such as remote attestation, as described in Trusted Computing Group, TPM Main Specification, Level 2, Version 1.2, Revision 116, March 2011. As another example, the obligation processing predicate logic can be used as a mechanism to identify an application to the infrastructure, so that the infrastructure can be informed of the presence of the application and thereby learn its requirements, and in turn the infrastructure can ensure that the application is receiving the required service level.

Figure 5:
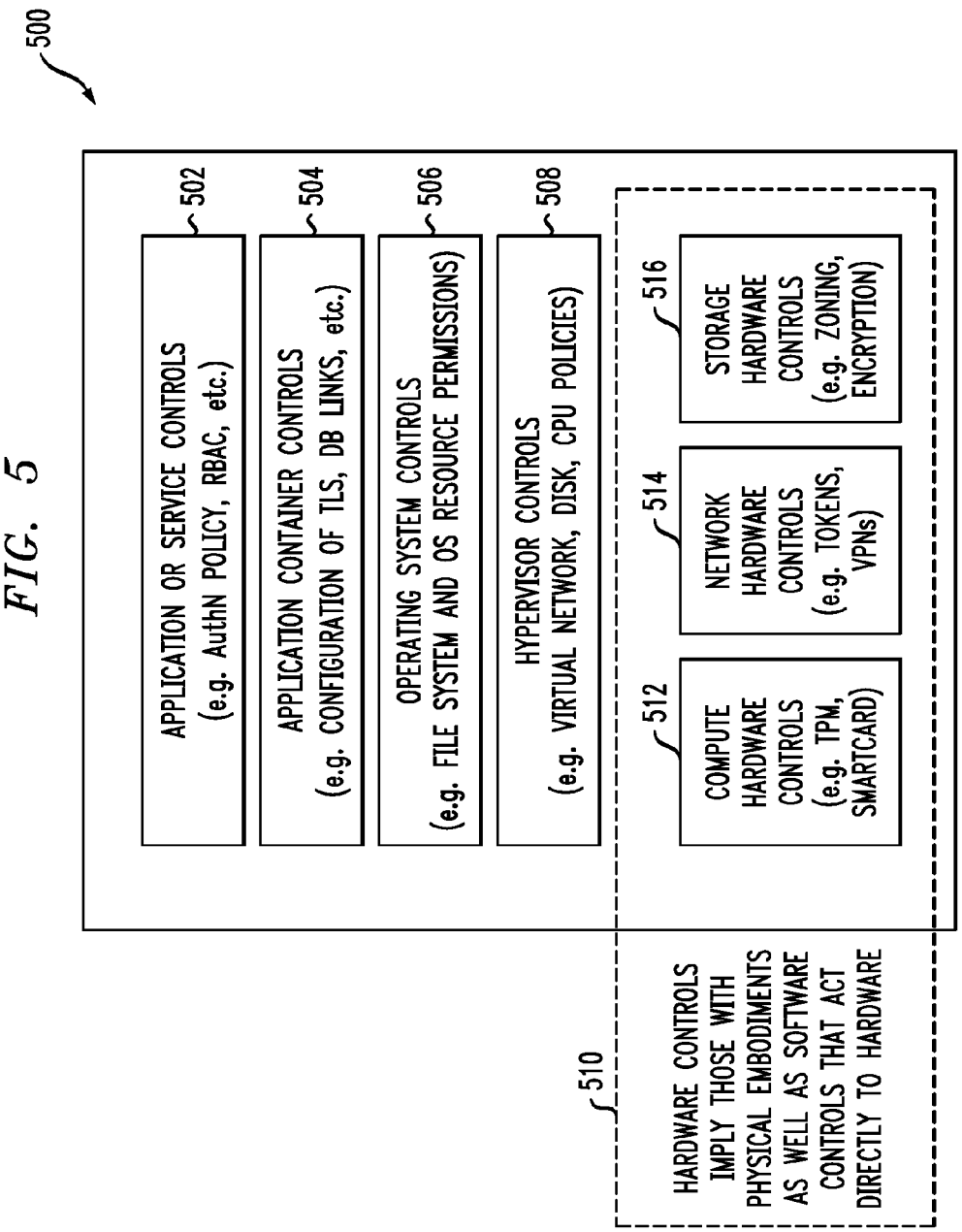
FIG. 5 illustrates exemplary information technology infrastructure controls that may be verified via obligations in the FIG. 1 system.

The controls that are verified using obligations in information processing system 100 may comprise a wide variety of different types of controls. Examples of such controls in the context of the service provider IT infrastructure 106 are shown in FIG. 5, which may be viewed as representing at least a portion of a stack that embodies a public or private service provider cloud. In this embodiment, a processing platform 500 of the service provider IT infrastructure 106 comprises application or service controls 502, application container controls 504, operating system controls 506, hypervisor controls 508, and hardware controls 510. The hardware controls 510 more specifically comprise compute hardware controls 512, network hardware controls 514, and storage hardware controls 516.

The controls may therefore comprise security controls, technical controls, process controls or other types of controls. By way of example, such controls may be classified into various categories, including preventative controls, detection-oriented controls, compensating controls, etc. An example of a control that may be viewed as both a preventative control and a detection-oriented control is to require a username and password before granting access to a system. The presence of that control ensures that only authorized users may consume resources and can also provide documentation of the occurrence for each user who has consumed resources. Other examples of controls may include a limitation on the amount of network bandwidth consumed by a particular user, and the use of encryption to protect access to stored data. Controls may also specify use of particular products, such as the Data Protection Advisor (DPA) product, also available from EMC Corporation. This product can be used to discover and manage storage assets, and allows tenants of a cloud service provider to determine information such as how many replicated copies of a file system or database exist in the storage infrastructure. These and other exemplary controls may be required to ensure regulatory compliance in an information processing system.

As indicated more specifically in FIG. 5, the application or service controls 502 may comprise, for example, authentication (AuthN) policy, role-based access control (RBAC) or other types of controls. The application container controls 504 may comprise, for example, configuration of transport layer security (TLS), database (DB) links, etc. Exemplary operating system controls 506 may include file system and operating system (OS) resource permissions. The hypervisor controls 508 may comprise virtual network, disk, and central processing unit (CPU) policies. The compute hardware controls 512 may include Trusted Platform Module (TPM), smartcard, etc. The network hardware controls 514 may comprise tokens, virtual private networks (VPNs), etc. Finally, the storage hardware controls 516 may comprise zoning, encryption, etc. Again, these illustrative controls referred to in the figure are presented by way of example only, and numerous other types of controls may be used.

One of the advantages of certain illustrative embodiments of the present invention is that such embodiments provide a way for the tenant to confirm the presence and performance of an appropriate representation of a control or controls, without requiring that the service provider specifically employ a particular vendor product or technology. More specifically, the obligation is a way for the service provider to provide the tenant with the required representations for the presence and performance of the control(s) without necessarily employing a specific product or technology, and without disclosing to the tenant what product or technology is present in the IT infrastructure. Thus, the obligation fulfiller and obligation management system in such embodiments together perform the function of preserving the privacy of the claimant (i.e., trade secrets, technology choices, etc.) while adequately satisfying the tenant's requirement for visibility to the service level.

Figure 6:
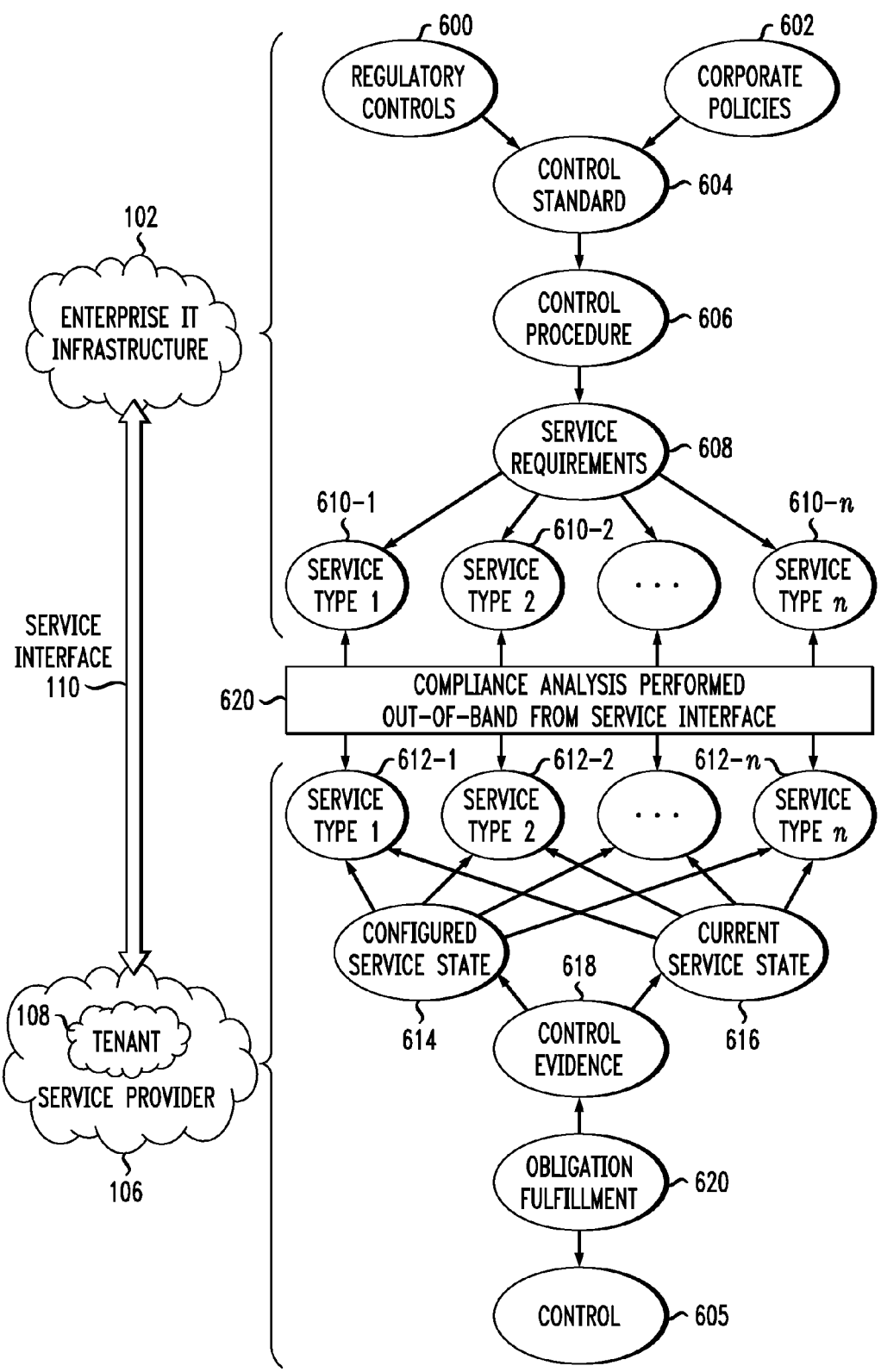
FIG. 6 shows a more detailed view of a portion of the control verification functionality in the FIG. 1 system.

FIG. 6 shows a more detailed view of a portion of the control verification functionality that may be implemented in the information processing system 100 of FIG. 1 in an illustrative embodiment. In the enterprise IT infrastructure 102, regulatory controls 600 and corporate policies 602 relating to information management may be utilized to generate, or are otherwise represented by, a control standard 604. The control standard 604 is a general expression of a control 605 that satisfies the regulatory controls 600 and the corporate policies 602. A control procedure 606 may be viewed as an expression of the specific process to be used for a specific application or set of information. Although the same control procedure 606 may be used for multiple applications or sets of information, the process or procedure to be used is specific, whereas the control standard 604 is typically a general expression. It is the control procedure 606 that requires the implementation of the corresponding control 605 in the service provider IT infrastructure 106. Thus, in the present embodiment, control standard 604 may be a normalized or abstract expression of control 605 that satisfies one or more regulatory controls 600 or corporate policies 602, while control procedure 606 is a specific expression of process that implements control standard 604 specific to one or more applications, information sets, or other resources.

The enterprise assigns service requirements 608 for the control procedure 606. For example, in the case of cloud storage services, the service requirements may specify a minimum number of copies of stored data and their respective storage locations. The service requirements 608 may also or alternatively identify service key performance indicators (KPIs) that indicate desired service levels or other service obligations to be enforced. These KPIs may allow service delivery description without dependence on underlying technologies and products. The KPIs can thereby be decoupled from the underlying technologies and products, and evolve independently of those technologies and products.

The service requirements in the FIG. 6 arrangement are organized into non-overlapping service types 610-1, 610-2, . . . 610-n. The service types may comprise, for example, lines of service, service packages, service offerings, or portions or combinations thereof, and any associated KPIs. The mapping of the control procedure 606 to the service requirements 608, and other enterprise portions of the operations illustrated in FIG. 6, may be implemented at least in part using an enterprise IT infrastructure management or GRC management system, such as the Archer eGRC system commercially available from RSA.

The service provider IT infrastructure 106 presents corresponding non-overlapping service types 612-1, 612-2, . . . 612-n. Associated with these service provider service types are two separate sets of service state information, namely, configured service state 614 and current service state 616, each organized into the same non-overlapping service types specific to the corresponding tenant 108. The configured service state 614 captures the intended behavior of the service provider IT infrastructure 106 based on configuration of hardware and software elements of that infrastructure. The current service state 616 captures the actual behavior of the delivered service based on observed behavior. The service states 614 and 616 reflect control evidence 618 gathered by an obligation fulfillment component 620 that is configured to verify the corresponding control 605.

The obligation management system 120 is responsible for mapping the service types 612 to observation of specific infrastructure functions by the obligation fulfillment element 620. The obligation fulfillment element 620 is also referred to herein as an obligation fulfiller. The purpose of the obligation fulfiller in the present embodiment is to serve as a proxy for the associated control 605. It tests or otherwise checks for the presence and performance of the control, and provides leverage for tenant verification of the presence and performance of that control.

The FIG. 6 arrangement therefore provides an automated mechanism for performance of continuous compliance assessment. The compliance analysis implemented in the embodiment of FIG. 6 may be performed out-of-band relative to the service interface 110, as indicated at 620, but may also or alternatively be performed at least in part using in-band data or control signaling of the service interface 110.

The KPIs utilized by the service requirements 608 may refer to hardware or software configuration, service delivery, or any other service provider infrastructure configuration or performance measure. By way of example, KPIs may specify a particular type of hardware SAN zoning to be used, a maximum number of failed access attempts, a maximum or minimum average response time for input-output operations, a minimum number of operations per unit time, etc. Determination of obligation fulfillment for a given KPI may utilize, for example, hardware or software configuration comparisons, technology-specific assessment of service delivery, or other techniques appropriate for that particular KPI.

Figure 7A:
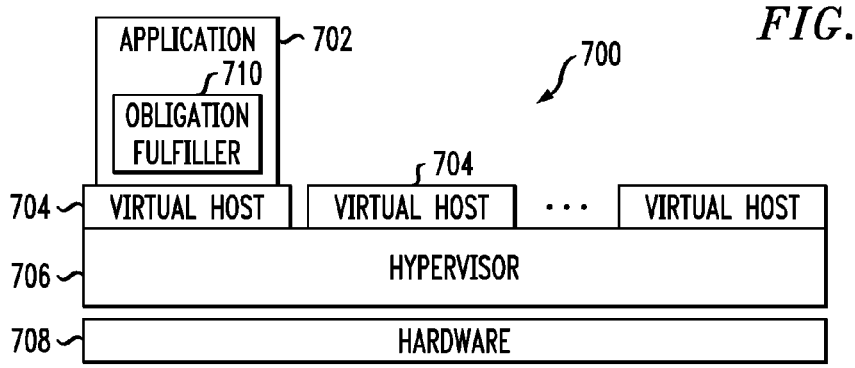
FIGS. 7A, 7B, 7C and 7D illustrate exemplary placements of obligation fulfillers in elements of information technology infrastructure of the FIG. 1 system.
Figure 7B:
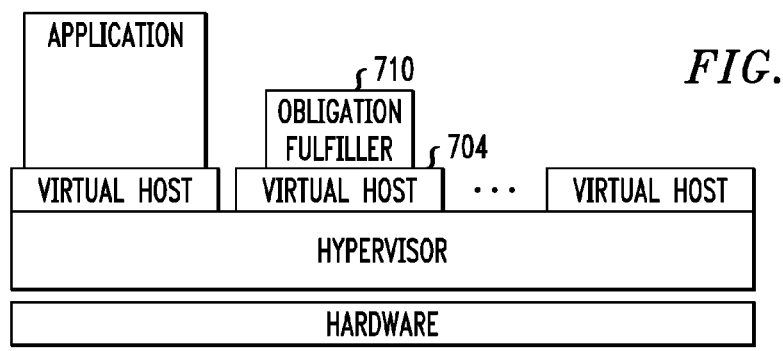
Figure 7C:
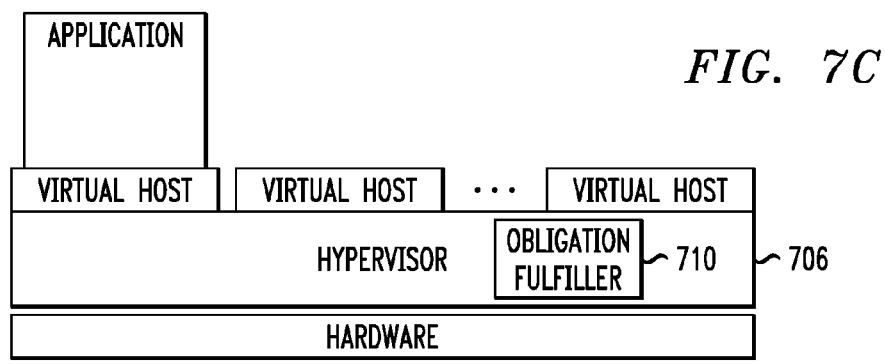
Figure 7D:
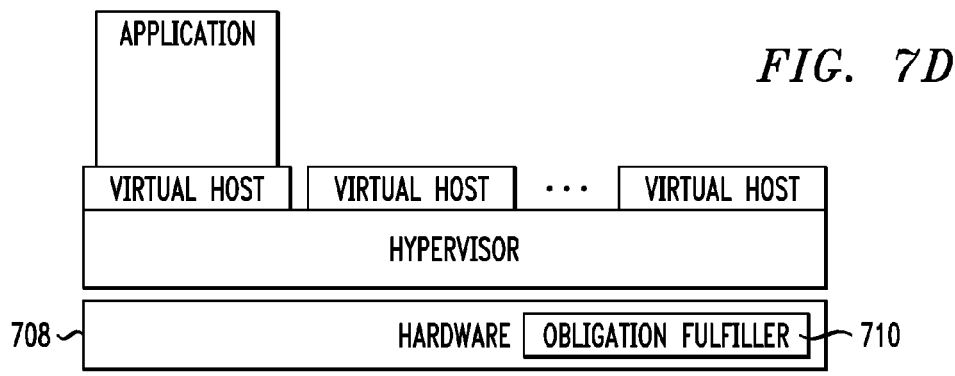

Examples of the manner in which an obligation fulfiller may be incorporated into various elements of the service provider IT infrastructure are shown in FIGS. 7A, 7B, 7C and 7D. In these examples, a processing platform 700 of the service provider IT infrastructure 106 comprises an application 702 which runs on one of a plurality of virtual hosts 704 associated with a hypervisor 706. The hypervisor utilizes underlying hardware 708. In FIG. 7A, an obligation fulfiller 710 is inserted or otherwise deployed as a software component in application 702. Other possible insertions of the obligation fulfiller 710 include as a software component running on the virtual host 704 as shown in FIG. 7B, within the hypervisor 706 as shown in FIG. 7C, and within hardware 708 as shown in FIG. 7D. It is to be appreciated that a given embodiment of the invention may include multiple obligation fulfillers 710 implemented in each of at least a subset of the exemplary IT infrastructure elements illustrated in FIG. 7. Also, other placements of the obligation fulfiller 710 are possible within the service provider IT infrastructure, although not specifically illustrated in FIG. 7. For example, the obligation fulfiller may run within a guest operating system of a virtual host 704, or within compute, network and storage hardware controls of the type shown in FIG. 5. These latter stack elements are not explicitly shown in FIG. 7.

Figure 8:
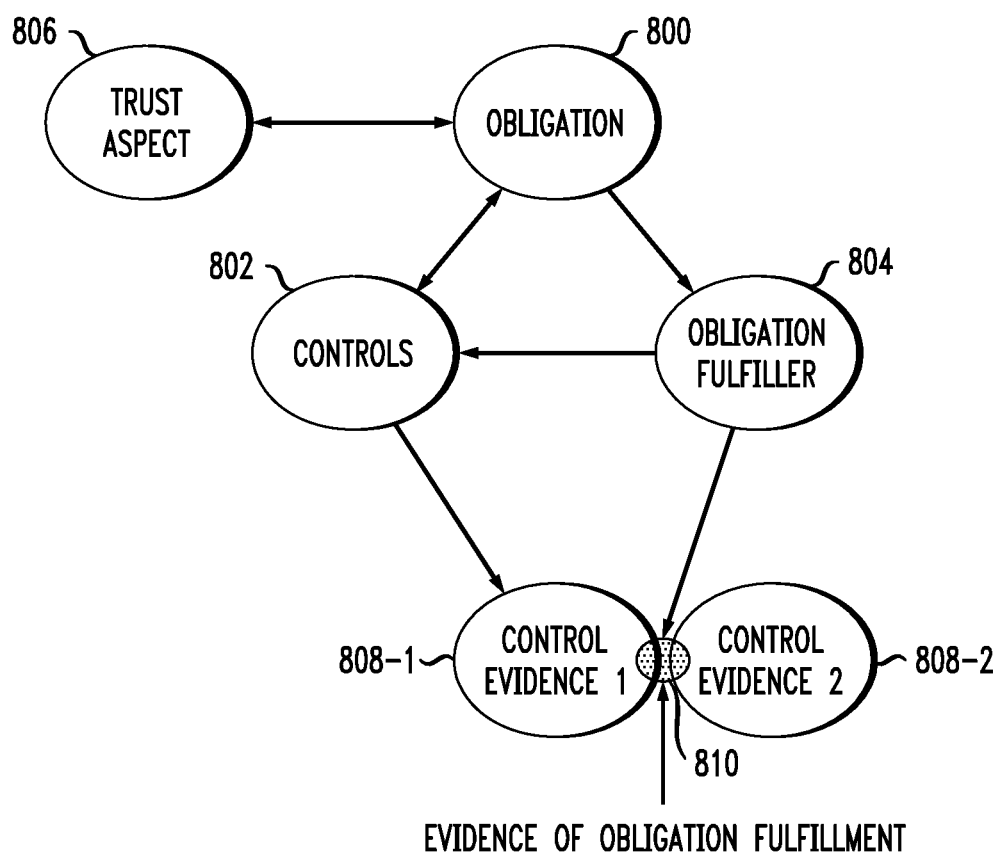
FIG. 8 shows exemplary interactions between obligations, controls and other system components.

Referring now to FIG. 8, exemplary interactions between obligations, controls and other components of information processing system 100 are shown. More specifically, a given obligation 800 is utilized to verify one or more controls 802 using obligation fulfiller 804, in order to establish trust aspect 806. In this example, the obligation fulfiller utilizes two different types of control evidence 808-1 and 808-2, also denoted Control Evidence 1 and Control Evidence 2, to generate evidence 810 of obligation fulfillment. The control evidence 808-1 may be directly provided by the one or more controls 802, while the control evidence 808-2 is not directly provided by those controls. The obligation fulfiller 804 in this embodiment therefore combines different types of evidence in determining obligation fulfillment. As shown, the combined evidence 810 utilizes only a subset of the two different types of control evidence 808-1 and 808-2. Although only a single trust aspect 806 is shown in the figure, it should be noted that establishment of a given level of trust in the service provider may require aggregation of multiple trust aspects.

As indicated above, the obligation fulfillers may be software or hardware components that are inserted or otherwise deployed in appropriate elements of the service provider IT infrastructure 106. Such components may be configured using an open source arrangement, such that all relying parties and claimants can easily confirm their correctness. The insertion of the obligation fulfiller into an element of the service provider IT infrastructure 106 is typically controlled by the service provider. However, in some embodiments the tenant may direct the insertion of the obligation fulfiller. For example, insertion of the obligation fulfiller into a tenant application can be done by the tenant as part of its application deployment process. Arrangements of this type may be similar to those to be described in conjunction with FIGS. 7 and 11.

The task of collecting, correlating, maintaining, administering and communicating the set of obligations fulfilled within the service provider environment may be performed by an obligation management system at the service provider. This system would serve to aggregate the obligations fulfilled in the service provider IT infrastructure, before these are communicated back to the relying party, in this case the tenant 108 associated with enterprise 104. The obligation management system may also serve as an interface between the relying party and the claimant. In addition, it can perform other functions such as inference and dependency management across different obligations, potentially within the same layer of the stack and also across different layers of the stack.

The obligation management system may also serve to provide logical partitioning across the different tenants that are being serviced within a service provider environment. For example, if there are many tenants that are sharing resources in a multi-tenant cloud and each of these tenants wishes to verify that they can trust that service provider to fulfill a specific and possibly distinct set of obligations, then the obligation management system can perform a function of collecting the asserted obligations from the infrastructure, and correlating these according to the needs of each tenant, while also maintaining the privacy and integrity of the data for the individual tenants.

Obligation assertions arising out of infrastructure components that are not in fact servicing a specific tenant should not be shared with that tenant, as this would be at best irrelevant, or misleading, and may even represent an inappropriate disclosure of sensitive information to an unauthorized tenant. In order to address this issue, the obligation management system may provide a function of collecting the obligation information from any shared infrastructure components and combining this with any obligation assertions that are specific to the tenant in question, before reporting out obligation fulfillment results to that tenant. The other tenants in the multi-tenant environment are handled in a similar manner. The obligation management system should of course apply standard security constructs to these and other communications with the tenants or other enterprise entities, such as appropriate authentication and authorization.

Standardized configuration validation protocols such as SCAP can also be applied to the obligation collection to ensure the environment is capable of supporting the obligations the tenant application requires, before, during and after the tenant actually deploys its application. For example, an advantage of SCAP is that it can provide a machine-readable description of the exact criteria for the quantified trust in the service provider. Thus, SCAP can be the language and syntax for representing the expected results from the evaluation of the predicate logic 400. Additional details on SCAP can be found in National Institute of Standards & Technology (NIST) Specification SP 800-126, Rev. 1, The Technical Specification for the Security Content Automation Protocol (SCAP), SCAP Version 1.1.

The obligation management system may be configured to track obligation fulfillers that are known to produce good results. Thus, the system may maintain a "white list" of obligation fulfiller components. Those skilled in the art will recognize that various techniques are applicable here, including the use of hashing or digest techniques on the obligation fulfiller components, combined with digital signatures, in order to validate their integrity and authenticity.

Figure 9:
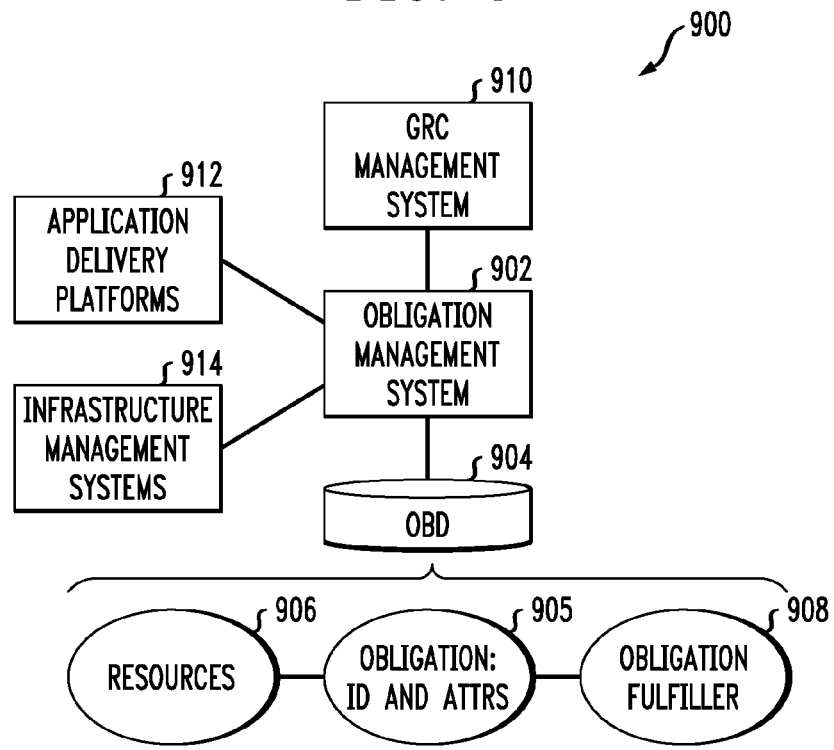
FIG. 9 shows interaction between an obligation management system and its associated obligation database as well as other components of the system of FIG. 1.

The interaction between an obligation management system and other IT infrastructure elements in an illustrative embodiment is shown in FIG. 9. A portion 900 of the information processing system 100 comprises obligation management system 902 and its associated obligation database 904, also designated OBD. The obligation management system 902 may correspond to at least a portion of the obligation management system 120 of FIG. 1. The obligation database 904 stores information characterizing multiple obligations. For a given such obligation 905, a unique identifier of the obligation is stored along with one or more obligation attributes. Also stored in association with the obligation 905 are corresponding infrastructure resource identifiers 906 and a corresponding obligation fulfiller 908. The obligation management system 902 in this embodiment is configured to interact with a GRC management system 910, application delivery platforms 912, and infrastructure management systems 914. The systems 910 and 914 may comprise one or more of the vCenter™, DPA or Archer systems noted above. An example of one possible implementation of the application delivery platform 912 is the VMware® vCloud™ Director.

The attributes stored for a given obligation may comprise metadata that characterizes the behavior of the obligation fulfiller at execution (i.e., runtime). Examples of this metadata include but are not limited to an identifier, a name, a description, the administrative owner, the scope and applicability of the obligation, whether the obligation is fulfilled conditionally or unconditionally, whether it is synchronous or asynchronous, the precedence with respect to other obligations, whether the obligation is fulfilled in-band or out-of-band, which controls the obligation is associated with, whether the obligation has an association or dependency on any other obligation(s), etc.

Figure 10:
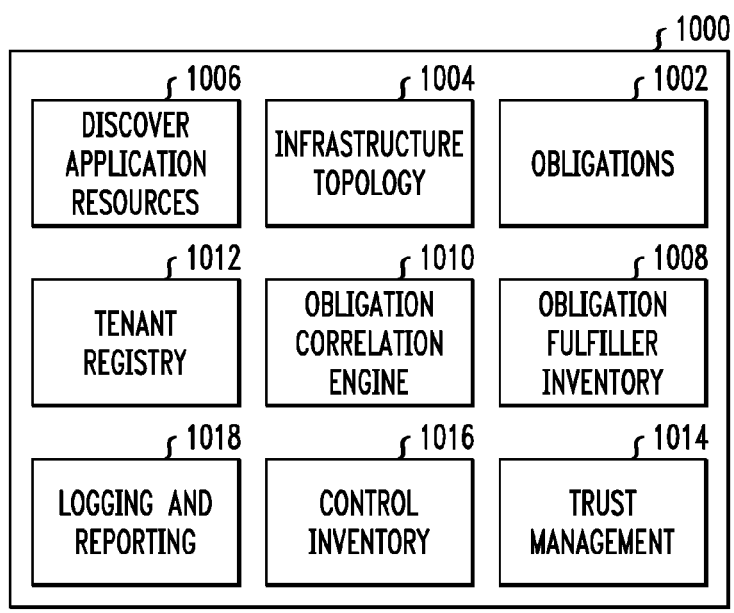
FIG. 10 is a block diagram of an obligation management system illustrating functional modules implemented within that system.

FIG. 10 illustrates exemplary functional modules that may be implemented in an obligation management system of the information processing system 100. In this embodiment, one or more processing devices 1000 of an obligation management system such as system 120 or system 902 collectively implement a plurality of modules, including an obligations module 1002, an infrastructure (e.g., physical and logical) topology module 1004, a resource discovery module 1006, an obligation fulfiller inventory module 1008, an obligation correlation engine 1010, a tenant registry module 1012, a trust management module 1014, a control inventory module 1016, and a logging and reporting module 1018.

It should be noted that this particular set of modules for implementing the control verification functionality of the obligation management system 120 or 902 is presented by way of example, and in other embodiments additional or alternative modules may be used. Also, the functionality associated with separate modules in the FIG. 10 embodiment may be combined into a smaller set of functional modules in other embodiments.

Figure 11A:
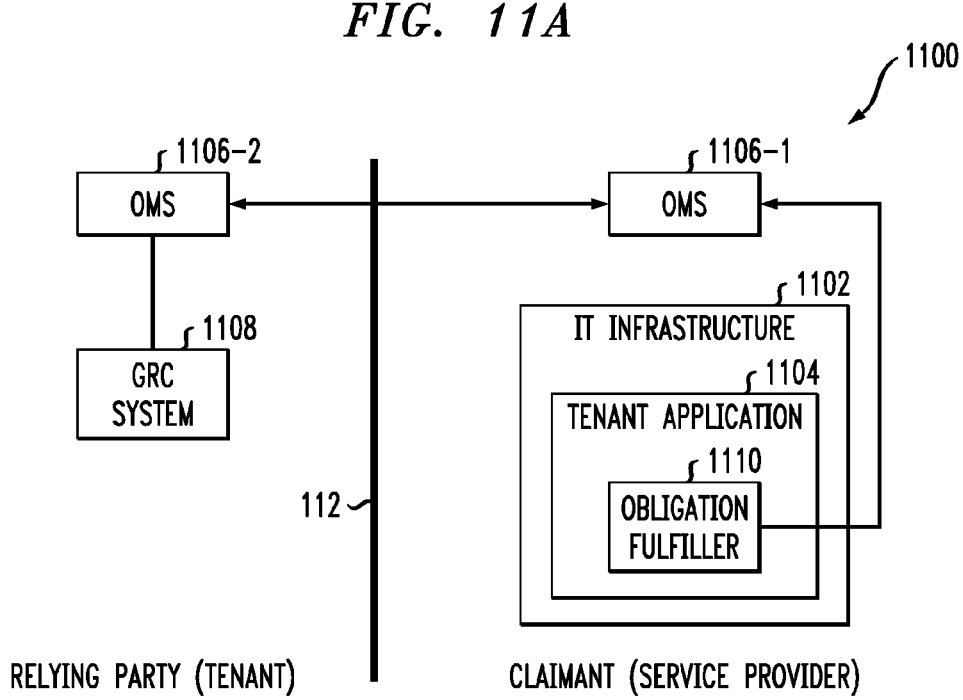
FIGS. 11A, 11B, 11C and 11D illustrate different ways that an obligation management system can be implemented in the information processing system of FIG. 1.

As noted previously, an obligation management system may be incorporated into the information processing system 100 in a variety of different ways. Examples will now be described in conjunction with FIGS. 11A, 11B, 11C and 11D. In these examples, it is again assumed that the tenant 108 is the relying party and the service provider is the claimant. Referring initially to FIG. 11A, a portion 1100 of the information processing system 100 comprises service provider IT infrastructure 1102 that runs a tenant application 1104. A first obligation management system 1106-1 is implemented on the service provider side of boundary 112 and interacts with a second obligation management system 1106-2 that is coupled to a GRC system 1108 on the enterprise side of the boundary 112. An obligation fulfiller 1110 is inserted or otherwise deployed in the tenant application 1104 within the IT infrastructure 1102 of the claimant. In one possible embodiment, an obligation assertion by the relying party may be processed by the obligation management systems 1106 to trigger the gathering of evidence by the obligation fulfiller 1110, thereby allowing the relying party to verify the presence and performance of one or more controls in the service provider IT infrastructure. In other embodiments, an obligation assertion need not be made by the relying party. For example, a claimant may publish its available obligation assertions, independently of whether there exists any specific relying party request.

Figure 11B:
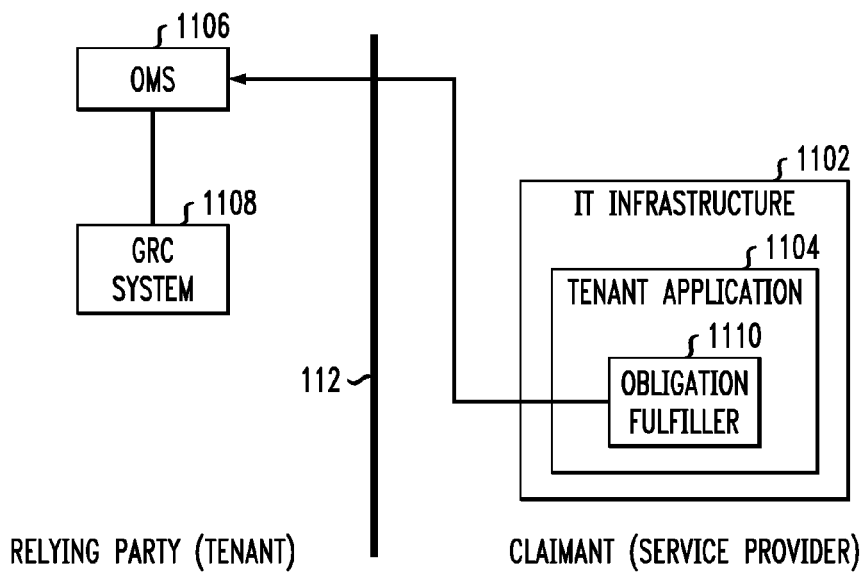
Figure 11C:
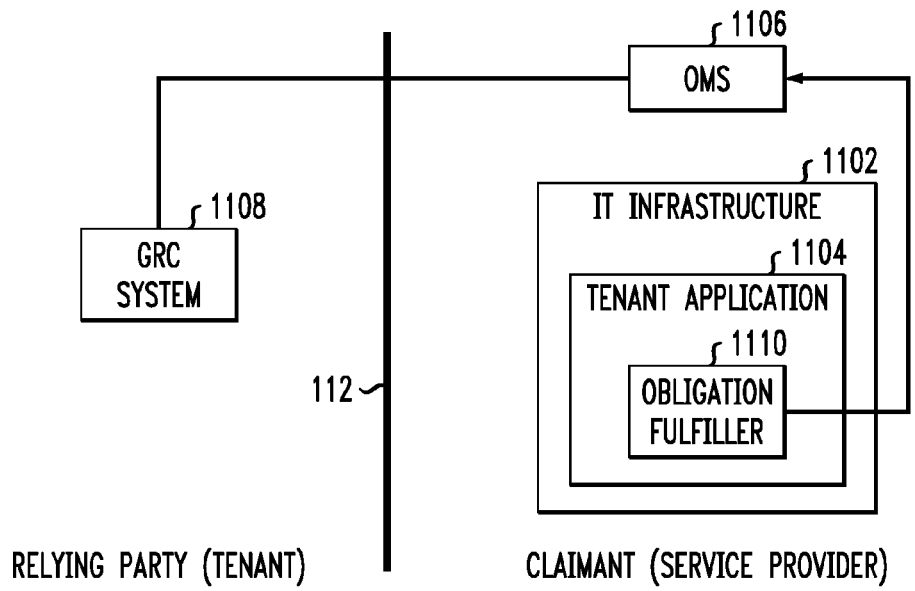
Figure 11D:
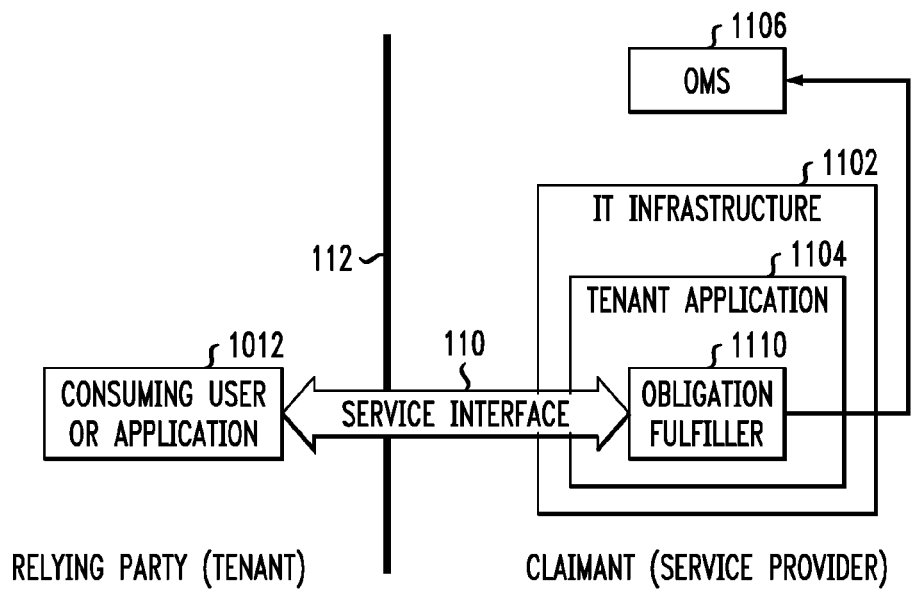

Alternative arrangements involving single obligation management systems 1106 are shown in FIGS. 11B, 11C and 11D. In the FIG. 11B arrangement, a single obligation management system 1106 is implemented on the enterprise side of the boundary 112, and interacts with the obligation fulfiller 1110 within the tenant application 1104 of the service provider IT infrastructure 1102. A similar arrangement but with the single obligation management system 1106 being implemented on the service provider side of the boundary 112 is shown in FIG. 11C. In the FIG. 11D arrangement, the obligation management system 1106 is again implemented on the service provider side of the boundary 112, but the tenant interaction with the obligation management system 1106 is not via GRC system 1108, but is instead directly via consuming user or application 1012 which communicates with tenant application 1104 over the service interface 110.

It should be understood that the particular obligation management system implementations described are exemplary only. In other embodiments, the obligation management system may be wholly or partially incorporated into the service provider or enterprise IT infrastructure. Also, a given obligation management system may be implemented in a centralized or distributed manner. For example, a single such obligation management system can be implemented on the service provider or enterprise side of the boundary 112, or different portions of the single obligation management system can be implemented on each side, in a distributed implementation.

The above-described illustrative embodiments advantageously provide a highly efficient and automated approach to control verification in IT infrastructure, thereby allowing relying parties such as cloud tenants to establish a quantified level of trust in their corresponding service providers. The obligation fulfillers ensure that the relying party is receiving the service level they expect and require on an on-going basis, rather than at a given point in time. Because the obligations are designed to support specific controls, the relying party can immediately know that it is in compliance with those controls, without having to wait for the results of a manual audit. In the event of non-compliance, the appropriate remediation can be automated so that the window of exposure is minimized. Remediation may include, but is not limited to, an application implementing one or more compensating controls, suspending certain functions, or simply shutting down.

The particular processing operations and other system functionality described in conjunction with the diagrams of FIGS. 3 through 11 are presented by way of illustrative example only, and should not be construed as limiting the scope of the invention in any way. Alternative embodiments can use other types of processing operations for implementation of obligation-based verification of service provider controls.

As indicated previously, functionality such as that described in conjunction with the diagrams of FIGS. 3 through 11 can be implemented at least in part in the form of one or more software programs stored in memory and executed by a processor of a processing device such as a computer or server. A memory having such program code embodied therein is an example of what is more generally referred to herein as a "computer program product."

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, obligation management system configurations, processing devices and information technology infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
at least one processing device comprising a processor coupled to a memory and implementing an obligation management system, the obligation management system being configured to process a plurality of obligations on behalf of a relying party to verify implementation of corresponding controls in information technology infrastructure of a claimant;
wherein a given one of the obligations has an associated obligation fulfiller that is deployed as a component within the information technology infrastructure of the claimant and is configured to provide evidence of the implementation of one or more of the controls responsive to an obligation assertion so as to establish an associated trust aspect of the claimant;

wherein the obligation fulfiller configures the evidence of the implementation of the one or more controls for delivery to the relying party responsive to the obligation assertion; and wherein the claimant comprises a cloud service provider and the relying party comprises a tenant of the cloud service provider.

2. The apparatus of claim 1 wherein the information technology infrastructure comprises distributed virtual infrastructure of the cloud service provider.

3. The apparatus of claim 1 wherein the tenant is configured to communicate via a service interface with information technology infrastructure of an enterprise.

4. The apparatus of claim 1 wherein the obligation management system implements obligation processing predicate logic that controls a mapping between obligation assertions and corresponding trust aspects of the claimant.

5. The apparatus of claim 1 wherein the controls comprise one or more of application controls, operating system controls, hypervisor controls and hardware controls of the information technology infrastructure of the claimant.

6. The apparatus of claim 1 wherein the obligation fulfiller is deployed as a component in at least one of an application, a virtual host, a hypervisor and a hardware element of the information technology infrastructure of the claimant.

7. The apparatus of claim 1 wherein the obligation fulfiller configures the evidence by combining evidence from a plurality of controls, responsive to assertion of the corresponding obligation, for delivery to the relying party.

8. The apparatus of claim 1 wherein the obligation management system is configured to interact with one or more of a compliance system, an infrastructure management system and an application delivery platform.

9. The apparatus of claim 1 wherein the obligation management system has an associated obligation database.

10. The apparatus of claim 9 wherein the obligation database stores obligations in association with infrastructure resource identifiers and corresponding obligation fulfillers.

11. The apparatus of claim 10 wherein each of the obligations is represented by an obligation identifier and is associated with one or more obligation attributes.

12. The apparatus of claim 1 wherein the obligation management system comprises a plurality of modules, including one or more of:
an obligations module;
an infrastructure topology module;
a resource discovery module;
an obligation fulfiller inventory module;
an obligation correlation module;
a tenant registry module;
a trust management module;
a control inventory module; and
a logging and reporting module.

13. The apparatus of claim 1 wherein the obligation management system interacts with another obligation management system implemented on another processing device, and wherein one of the obligation management systems is controlled by the relying party and the other is controlled by the claimant.

14. The apparatus of claim 1 wherein the obligation management system interacts with an obligation fulfiller deployed in a tenant application of the information technology infrastructure of the claimant.

15. The apparatus of claim 1 wherein an application of the relying party interacts with an obligation fulfiller deployed as a component within the information technology infrastructure of the claimant, with the interaction being via a service interface between the relying party and the claimant.

16. The apparatus of claim 1 wherein the obligation management system is configured to interact with obligation fulfillers that are installed as components within the information technology infrastructure of the claimant and serve as respective proxies for exposing characteristics of one or more of the controls of that infrastructure.

17. The apparatus of claim 16 wherein the obligation management system and the obligation fulfillers are collectively configured to preserve privacy of the claimant in designated aspects of its infrastructure while also providing the tenant with visibility to service levels provided by the claimant infrastructure.

18. An apparatus comprising:
at least one processing device comprising a processor coupled to a memory and implementing an obligation management system, the obligation management system being configured to process a plurality of obligations on behalf of a relying party to verify implementation of corresponding controls in information technology infrastructure of a claimant;
wherein a given one of the obligations has an associated obligation fulfiller that is deployed as a component within the information technology infrastructure of the claimant and is configured to provide evidence of the implementation of one or more of the controls responsive to an obligation assertion so as to establish an associated trust aspect of the claimant;
wherein the obligation fulfiller configures the evidence of the implementation of the one or more controls for delivery to the relying party responsive to the obligation assertion; and
wherein the relying party comprises a cloud service provider and the claimant comprises a tenant of the cloud service provider.

19. A method comprising the steps of:
providing an obligation management system for information technology infrastructure of a claimant; and
processing in the obligation management system a plurality of obligations on behalf of a relying party to verify implementation of corresponding controls in the information technology infrastructure;
wherein a given one of the obligations has an associated obligation fulfiller that is deployed as a component within the information technology infrastructure of the claimant and is configured to provide evidence of the implementation of one or more of the controls responsive to an obligation assertion so as to establish an associated trust aspect of the claimant;
wherein the obligation fulfiller configures the evidence of the implementation of the one or more controls for delivery to the relying party responsive to the obligation assertion; and
wherein the claimant comprises a cloud service provider and the relying party comprises a tenant of the cloud service provider.

20. A non-transitory computer program product comprising a processor-readable storage medium having encoded therein executable code of one or more software programs, wherein the one or more software programs when executed by a processing device implements the steps of the method of claim 19.

21. The method of claim 19 wherein the obligation management system implements obligation processing predicate logic that controls a mapping between obligation assertions and corresponding trust aspects of the claimant.

22. An information processing system comprising:
information technology infrastructure of a claimant; and
an obligation management system coupled to the information technology infrastructure, the obligation management system being configured to process a plurality of obligations on behalf of a relying party to verify implementation of corresponding controls in the information technology infrastructure;
wherein a given one of the obligations has an associated obligation fulfiller that is deployed as a component within the information technology infrastructure of the claimant and is configured to provide evidence of the implementation of one or more of the controls responsive to an obligation assertion so as to establish an associated trust aspect of the claimant;
wherein the obligation fulfiller configures the evidence of the implementation of the one or more controls for delivery to the relying party responsive to the obligation assertion;
wherein the claimant comprises a cloud service provider and the relying party comprises a tenant of the cloud service provider; and
wherein the information technology infrastructure comprises at least one processing platform comprising one or more processing devices.

23. The information processing system of claim 22 wherein said at least one processing platform comprises a plurality of processing devices with each such processing device of the processing platform comprising a processor coupled to a memory.

* * * * *